(12) United States Patent
Greminger et al.

(10) Patent No.: US 8,883,253 B2
(45) Date of Patent: Nov. 11, 2014

(54) PROCESS FOR FORMING AND DEVOLATILIZING BROMINATED POLYBUTADIENE POLYMER PARTICLES

(75) Inventors: Douglas C. Greminger, Midland, MI (US); Brian D. Scherzer, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 938 days.

(21) Appl. No.: 13/057,251

(22) PCT Filed: Aug. 18, 2009

(86) PCT No.: PCT/US2009/054146
§ 371 (c)(1),
(2), (4) Date: Feb. 2, 2011

(87) PCT Pub. No.: WO2010/022041
PCT Pub. Date: Feb. 25, 2010

(65) Prior Publication Data
US 2011/0143030 A1    Jun. 16, 2011

Related U.S. Application Data

(60) Provisional application No. 61/089,711, filed on Aug. 18, 2008.

(51) Int. Cl.
| | | |
|---|---|---|
| B05D 7/00 | (2006.01) | |
| B05D 1/02 | (2006.01) | |
| B05D 5/00 | (2006.01) | |
| C08L 51/04 | (2006.01) | |
| C08J 3/12 | (2006.01) | |
| C08F 287/00 | (2006.01) | |
| C08L 51/00 | (2006.01) | |
| C08C 19/12 | (2006.01) | |
| C08C 2/00 | (2006.01) | |
| C08F 285/00 | (2006.01) | |
| C08F 279/02 | (2006.01) | |

(52) U.S. Cl.
CPC . *C08C 2/00* (2013.01); *C08L 51/04* (2013.01); *C08J 3/122* (2013.01); *C08F 287/00* (2013.01); *C08L 51/003* (2013.01); *C08L 51/006* (2013.01); *C08C 19/12* (2013.01); *C08F 285/00* (2013.01); *C08F 279/02* (2013.01); *C08J 2315/02* (2013.01)
USPC ........... 427/212; 427/422; 427/425; 427/427; 427/427.4

(58) Field of Classification Search
CPC .............. B05D 7/00; B05D 7/02; B05D 1/02; B05D 1/002; B05D 1/025; C08J 2315/02; C08J 51/003
USPC ........................ 427/212, 422, 425, 427, 427.4
See application file for complete search history.

(56) References Cited

U.S. PATENT DOCUMENTS

| | | | | |
|---|---|---|---|---|
| 3,251,428 A | * | 5/1966 | Tabler | ............................ 427/213 |
| 4,263,091 A | | 4/1981 | King | |
| 4,310,973 A | * | 1/1982 | King | ................................ 34/368 |
| 4,526,958 A | * | 7/1985 | King | ................................ 159/44 |
| 4,547,976 A | | 10/1985 | King | |
| 7,547,741 B2 | | 6/2009 | Pakusch | |
| 2005/0031870 A1 | | 2/2005 | Liu et al. | |
| 2009/0118427 A1 | * | 5/2009 | Gorman | ........................ 525/98 |
| 2010/0004402 A1 | | 1/2010 | King et al. | |

FOREIGN PATENT DOCUMENTS

| | | |
|---|---|---|
| EP | 1621571 A | 2/2006 |
| WO | 2004010165 A | 2/2006 |
| WO | 2009061600 A | 5/2009 |

OTHER PUBLICATIONS

Okaniwa et al., "Radical graft polymerization onto composite particles . . . ". Colloid Polym. Sci. 275, 315-322 (1997).

* cited by examiner

*Primary Examiner* — Timothy Meeks
*Assistant Examiner* — Ann Disarro
(74) *Attorney, Agent, or Firm* — Gary C Cohn PLLC

(57) ABSTRACT

Brominated butadiene polymers are recovered from solution and formed into particles by spraying the solution onto a heated, mechanically agitated bed of seed particles. The droplets contact the seed particles in the bed and form a polymer layer on the outside of the seed particles, thereby enlarging them. The solvent is removed from the droplets after they make contact with seed particles in the bed. The process allows for the simultaneous removal of solvent and formation of somewhat large particles. The process forms at most small amounts of agglomerates and fines.

7 Claims, No Drawings

PROCESS FOR FORMING AND DEVOLATILIZING BROMINATED POLYBUTADIENE POLYMER PARTICLES

This application claims priority from U.S. Provisional Patent Application No. 61/089,711, filed 18 Aug. 2008.

The present invention relates to a process for forming devolatilized particles of a brominated polybutadiene polymer from a process solution or slurry.

Brominated butadiene polymers are of interest as flame retardant additives for other polymer systems. A brominated styrene/butadiene block copolymer, for example, has been proposed as a flame retardant additive for polystyrene foams. If prepared carefully, brominated butadiene polymers and copolymers can be thermally stable enough that they can be processed with another bulk polymer in a melt processing operation such as extrusion or injection molding. At higher temperatures, such as are encountered in fire situations, the brominated butadiene polymer releases HBr. HBr is believed to perform a flame suppressing function.

The brominated butadiene polymer is generally made by brominating the starting butadiene polymer with elemental bromine or a quaternary ammonium tribromide as the bromine source. A direct bromination process using bromine is described in WO 2008/021418. WO 2008/021417 describes a process for brominating a butadiene copolymer in which the brominating agent is a phenyltrialkylammonium tribromide, benzyltrialkylammonium tribromide or tetraalkylammonium tribromide.

The bromination processes are conducted with the starting polymer in solution. The product brominated polymer usually remains in solution but sometimes partially precipitates to form a wet slurry. It is necessary to separate the brominated product from the process solvents. In order to facilitate subsequent handling, the brominated copolymer should be formed into particles that have volume average particles sizes of at least 0.5 millimeter. The particles can be as large as 15 millimeters in some cases.

Several approaches for doing this exist in the art. Ordinary devolatilization processes can be used, in which the brominated polymer solution is heated in a series of flash chambers to remove solvent. The polymer solution becomes very viscous towards the end of this process. As a result, long residence times are needed to remove the solvent, and the brominated polymer is subjected to a great deal of heat. This causes the brominated butadiene polymer to degrade or to develop impurities. The polymer then must be mechanically or thermally (through melting or heat-plastifying) formed into particles in a subsequent step.

In another approach, the brominated polymer solution is sprayed to form droplets. The droplets are heated to drive off the solvent. Solid particles of brominated polybutadiene form. These are dispersed into a nonsolvent liquid such as water, which washes the particles and removes soluble impurities. The nonsolvent liquid is usually heated to help drive residual solvent from the particles. This process works well, but has the disadvantage that large volumes of fluids must be handled and recovered. That leads to capital and operating costs that are higher than desired.

Therefore, a method is needed by which the solvent can be removed efficiently from the brominated butadiene polymer and by which the brominated polymer can be efficiently formed into particles. The process ideally should not expose the brominated polymer to high temperatures, or if high temperatures are needed, the process should expose the brominated butadiene polymer to those temperatures for only a short time.

The present invention is in one aspect a process for producing particles of a brominated butadiene polymer, comprising forming a solution of the brominated butadiene polymer into droplets, and contacting the droplets with a heated, mechanically agitated bed of seed particles, such that the droplets coat the surfaces of seed particles substantially without agglomerating individual particles and solvent volatilizes from the coated seed particles to form substantially nonagglomerated particles having a solid external layer of the brominated butadiene polymer.

This process simultaneously removes solvent from the brominated butadiene polymer and forms the polymer into particles. Particles can be grown to any convenient particle size through one or more growth stages in accordance with the invention. Moderate processing temperatures below the glass transition temperature of the neat brominated butadiene polymer are used. These moderate temperatures reduce the amount of thermal degradation that occurs and in turn introduces fewer impurities into the brominated butadiene polymer. The process can be operated continuously or batch-wise.

The brominated butadiene polymer solution that is the starting material in this process includes a brominated butadiene polymer and at least one solvent. The brominated butadiene polymer is formed by brominating a polymer or copolymer of butadiene. Suitable starting butadiene polymers and copolymers are described below. The brominated polymer preferably is selectively brominated so that essentially all bromination occurs at sites of aliphatic carbon-carbon unsaturation in the starting polymer. In particular, the polymer preferably has little or no bromination on any aromatic rings that may be present. Even more preferably, the polymer has little or no bromination at tertiary carbon atoms, contains few or no sites of hydrobromination (i.e. sites at which bromine and hydrogen from HBr have added across the double bond), and contains few or no ether groups or other oxygen-containing groups. The presence of significant amounts of these groups tends to reduce the thermal stability of the brominated butadiene polymer. In addition, it is preferred that at least 80%, preferably at least 90%, more preferably at least 95%, and still more preferably at least 98%, of the butadiene units in the starting polymer have been brominated. Residual aliphatic carbon-carbon double bonds left over from the starting material can lead to gelling or other undesired reactions when the brominated polymer is used in a melt-processing operation.

The solvent must have sufficient vapor pressure at the processing temperature and pressure that it can be removed quickly from the droplets. The solvent preferably boils, at atmospheric pressure or some subatmospheric pressure, at a temperature below the highest glass transition temperature of the neat brominated butadiene polymer. Examples of suitable solvents include ethers such as tetrahydrofuran; halogenated alkanes such as carbon tetrachloride, chloroform, dichloromethane, bromochloromethane ($CH_2BrCl$), dibromomethane and 1,2-dichloroethane; hydrocarbons such as cyclohexane and toluene; and halogenated aromatic compounds such as bromobenzene, chlorobenzene and dichlorobenzene. The solvent is preferably aprotic, i.e. does not contain hydrogen atoms attached to heteroatoms such as oxygen, sulfur or nitrogen. The solvent may be a mixture of solvents, such as a halogenated solvent with of a small amount of hydrocarbon solvent.

The brominated butadiene polymer solution may be obtained from a direct bromination process in which the starting butadiene polymer is brominated with elemental bromine. An aliphatic alcohol may be present during the bromination reaction, as described in WO2008/021418. Residual bromine and other by-products can be removed from the resulting brominated butadiene polymer solution, by extraction, washing, or other useful methods, before the solution is processed according to the invention to form particles.

Alternatively, the brominated butadiene polymer solution may be obtained by brominating the starting butadiene polymer with a quaternary ammonium tribromide. In a preferred such process, the starting butadiene polymer is contacted with the quaternary ammonium tribromide under conditions such that they react to produce a solution of the brominated butadiene polymer and a quaternary ammonium monobromide byproduct. The quaternary ammonium monobromide is preferably extracted with an aqueous phase containing a reducing agent to remove the quaternary ammonium monobromide stream from the brominated polymer solution.

The brominated butadiene polymer solution is a liquid at the processing temperatures and thus can be formed into droplets.

To remove the solvent and form particles, the brominated butadiene polymer solution is formed into droplets and dispersed onto a heated, mechanically agitated bed of seed particles. The droplets can be introduced into the reaction vessel by spraying them into the head space, and/or by introducing the droplets directly into the mechanically agitated bed of seed particles.

Droplets can be formed using a variety of spray nozzles. If the solution has a viscosity that is low enough, single fluid nozzles can be used to generate the droplets. Feed pressure can be adjusted as necessary to form droplets from solutions having a range of viscosities. Higher viscosity solutions can be formed into droplets using a two-fluid nozzle, in which a gas is sprayed through the nozzle simultaneously with the brominated butadiene polymer solution to assist in atomizing the solution. The gas used for atomization will also act as a sweep gas to help remove solvent vapors from the mechanically agitated bed of particles.

The concentration of the brominated butadiene polymer and the temperature of the polymer solution both greatly affect viscosity. Higher concentrations increase the viscosity while higher temperatures lower the viscosity. Preferably, the brominated butadiene polymer solution contains from 1 to 40%, more preferably from 5 to 30% by weight of the brominated butadiene polymer.

The brominated butadiene polymer solution can be introduced into the reaction vessel through a pipe inserted directly into the mechanically agitated bed of solids. In this instance, the outlet of the pipe is preferably located close to a high-shear "chopper" mixer installed so that the mixer is below the surface of the mechanically agitated bed of solids. The "chopper" mixer breaks the solution into droplets. These high shear choppers are available commercially in plowshare mixers sold by Littleford Day and others.

In an especially preferred process, the brominated butadiene polymer solution is introduced into the reaction vessel at approximately the same solvent content and approximately the same temperature (such as +/−10° C.) at which it is produced in the immediately preceding upstream process step. This reduces or eliminates the need to adjust temperature and/or concentration of the solution before processing it to remove the solvent and form particles. The immediately preceding upstream process step may be, for example, a bromination step in which a starting butadiene polymer is contacted with a brominating agent such as elemental bromine (as described, for example, in WO 2008/021418), a quaternary ammonium tribromide (as described, for example, in WO 2008/021417), or a quaternary phosphonium tribromide. The immediately preceding upstream process step may be an aqueous extraction step, in which a crude brominated butadiene polymer obtained from a bromination step is extracted with water, typically containing a reducing agent, to produce a washed solution of the brominated butadiene solution.

The seed particles can be any material which is a solid under the conditions of the process, is thermally and chemically stable under the conditions of the process, and which does not react in an undesirable manner with the brominated butadiene polymer. The seed particles should have a melting temperature and/or glass transition temperature at least equal to that of the neat brominated butadiene polymer, so that they do not melt or soften in the process. The seed particles should not dissolve in the solvent under the conditions of the process. The material that forms the seed particles should also be one whose presence can be tolerated in downstream applications in which the brominated butadiene polymers can be used.

Thus, for example, the seed particles can be particles of the same brominated butadiene polymer, or of a different brominated butadiene polymer. For example, a small portion of the particles that are obtained in the process can be re-ground to form seed particles. Fines that are produced during the process also can be used as seed particles.

Other polymers can be used as the seed particles. The seed particles can be particles of a polymer in which the brominated butadiene will be blended in a downstream operation. For example, if the brominated butadiene particles are to be used as a flame retardant additive for polystyrene foam, polystyrene can be used as the seed particles. In such a case, the particles that are formed in the process will be composite particles containing both the seed particle polymer and the brominated polymer particles.

Alternatively, a variety of other inorganic or organic materials can be used as the seed particles.

The volume median particle diameter of the seed particles preferably is from about 10 to 90% of the diameter of the final product, and more preferably from 10% to 70% of the diameter of the final product. The more preferred range allows the volume of the particles to increase by a factor of about 2.9 to about 1000 during the process. In absolute terms, the seed particles preferably have a volume median particle diameter of from 50 microns to 3000 microns. They preferably have a volume median particle diameter of at least 500 microns and more preferably at least 1300 microns. They preferably have a volume median particle diameter of up to 2000 microns, more preferably up to 1400 microns.

The seed particles are placed into a vessel in which they can be heated and mechanically agitated while being brought into contact with the droplets of the brominated butadiene polymer solution. The specific design of the vessel is not critical. Preferably, the vessel can be operated at subatmospheric pressures. The vessel may be adapted for either continuous or batch operation. The vessel may also be in the form of a series of such vessels operated such that the product produced in one is transferred to the next as seed, either continuously or intermittently.

The vessel should include means for removing the volatilized solvent, such as various types of vents, exhaust stacks, and the like. Pumps, fans or other apparatus can be included to establish a positive flow of gas out of the vessel during operation, and/or to establish a desired subatmospheric pressure in the vessel. Preferably, the exhaust is filtered to remove entrained droplets or fine brominated butadiene polymer particles that may form in the process. The vessel also preferably includes one or more inlets through which gases can enter the vessel while controlling internal pressures. This allows for pressure control and to establish a sweep gas flow through the vessel if desired. The apparatus may further include means for condensing the volatilized solvent that is removed from the vessel.

A preferred type of vessel is a horizontally oriented, cylindrical vessel which has an axially-rotating shaft to which multiple agitating members are affixed. The agitating members can be shaped in the form of "plows" which, when the shaft is rotated, move through the seed particles and provide the needed mechanical agitation. Heat can be externally applied through an external jacket. So-called "plowshare" reactors of this type are commercially available from Littleford Day, Florence, Ky.

The amount of seed particles present at the start of the process is dictated by equipment design considerations and by the desired growth of the particles. At a minimum, enough of the seed particles should be in the vessel at the start of the batch process that they make contact with the mechanical agitators and can be fluidized by the action of the agitators. The process generally requires that some head space be available in the vessel at all times, to allow a space for droplets of the brominated butadiene polymer solution to be introduced and/or to allow space for the solvent to volatilize. Therefore, the amount of the seed particles that are present should take into account the amount of particle growth that will occur in the process. The head space should amount to at least 25% of the available volume of the vessel at all times during the process.

The seed particles are heated inside of the vessel to the operating temperature, and the pressure in the vessel is brought (if necessary) to the desired operating pressure. A flow of sweep gas is established if desired. The seed particles are fluidized by action of the mechanical agitator, and the brominated butadiene polymer solution is introduced into the reaction vessel in the form of droplets. The droplets can take the form of a mist or spray that is introduced into the headspace of the vessel, or can be introduced within the seed particle bed using mechanical means such as a chopper. Operating temperatures and pressures, the flow of sweep gas (if any) and mechanical agitation are continued during the time that the solution is being introduced.

The droplets of the brominated butadiene polymer solution contact the bed of seed particles, where solvent volatilizes from the droplets and the brominated butadiene polymer solidifies to form coatings onto individual particles. Some solvent may volatilize from the droplets before they contact the seed particles. This is acceptable, provided that enough solvent remains in the droplets that the droplets remain in the form of a fluid which, upon contacting the particles, can coat and adhere to the seed particles. Fines are produced when too much of the solvent is volatilized from the droplets before they contact the seed particle bed, because in that case the droplets form hardened particles that do not adhere to the surface of the seed particles.

The droplets contact the seed particles, whereupon the droplets each coat at least a portion of the exterior of a seed particle. With sufficient mechanical agitation, the droplets tend to become dispersed over the surface of the individual particles to form a shell or a partial shell. The droplets tend to become distributed to all particles so that the brominated butadiene polymer layer that forms at a given time during the process is of approximately equal thickness on all particles. For small diameter seed particles this layer can result in a large proportional change in diameter. For large diameter seed particles, this layer represents only a small proportional change in the diameter. Thus, the proportional increase in the diameter of the particles tends to become smaller over time. The growing particles usually assume a somewhat smooth and rounded surface and a somewhat spherical shape.

Solvent is removed from the droplets after they have contacted the seed particles and formed a coating thereon. Ideally, the solvent is removed from a coated particle before the particle becomes contacted by successive droplets that are subsequently introduced into the reaction vessel. The removal of the solvent in this manner allows the brominated butadiene polymer to precipitate and form a solid, adherent, non-tacky coating on the surface of the seed particle. It is generally preferably to reduce the solvent content in the applied coatings to no greater than 5% by weight, more preferably no greater than 1% by weight. At those levels of solvent, the coating generally will not be tacky, and so the coated particles will have little tendency to stick together. The solvent content can be reduced to lower levels if desired. As mentioned below, a devolatilization step may be performed to further reduce the solvent content of the particles.

The solvent should be removed very rapidly once the droplets have made contact with the particles. The presence of any significant amount of solvent in an applied coating can cause particles to adhere together and form agglomerates or other large masses. This agglomeration or adhesion can occur due to surface tension effects or capillary action between particles due to the presence of a liquid phase at the surface, due to cohesion between particles surfaces are tacky because the solvent has not been completely removed, or for other reasons.

Solvent removal that is too slow often results in the particle bed becoming wet. The particle bed should remain substantially dry. By "substantially dry", it is meant that the particles in the bed can be fluidized as single particles or perhaps as short-lived agglomerates of small number of particles. These short-lived agglomerates are usually held together by electrostatic or van der Wals forces, and are not permanently bound together. In a substantially dry bed, the amount of liquid materials (such as solvent, dissolved brominated butadiene polymer or melted brominated butadiene polymer) in the bed is low enough at all times that the particles do not significantly adhere or agglomerate together. A wet bed will usually become more difficult to fluidize, due to the weight of the solvent in the particles and the adhesion or agglomeration of particles into larger masses. The energy needed to fluidize the bed will increase. This is manifested by an increase in energy needed to operate the mechanical agitators at a given rate, or by a reduced rate of agitation at a given energy input. Therefore, an increase in the energy consumed to operate the mechanical agitators and/or a reduced output of the mechanical agitators can in some instances indicate that the particle bed has become wet.

The solvent removed from the droplets forms a gas which, if not taken from the reaction vessel, will accumulate and increase the pressure in the reaction vessel. The vaporized solvent is conveniently removed from the reaction vessel by operating the process at subatmospheric pressure, by establishing a flow of sweep gas through the vessel, or by simply venting the vessel. Some combination of these approaches can be used. A sweep gas may be depleted in oxygen relative to air, in order to reduce the risk of combustion of the vaporized solvent.

The size of the particles increases as coatings are applied in the foregoing manner. Over time, multiple coatings are applied to individual particles by the successive deposition and drying of droplets onto the particle surface, and the particle increases in size as each successive coating layer is formed. The process is continued until the particles have achieved the desired size.

The operation of the process depends on several interrelated operating parameters, including, for example, the operating temperature, operating pressure, the size of the droplets, the rate at which the droplets are introduced to the vessel, the mass of the bed of solids and its particle size distribution, the particular solvent that is used, and the rate at which the particles are agitated. Therefore, these operating parameters are selected in conjunction with each other in order to operate the process in the manner described above. The main conditions to be avoided are particle agglomeration and excessive fines formation.

The operating temperature preferably is below the glass transition temperature of the neat brominated butadiene polymer. If the brominated butadiene polymer has multiple glass transition temperatures, the operating temperature should be below the highest glass transition temperature. This allows the brominated butadiene polymer to form a solid, non-tacky coating on the surface of the seed particles when the solvent is removed. For purposes of this invention, a "neat" brominated butadiene polymer contains no more than 1% by weight of the process solvent. Preferably the operating temperature is at least 10° C. lower than the highest glass transition temperature of the neat brominated butadiene polymer. A process temperature of below 110° C. will in most cases be below the highest glass transition temperature of the brominated butadiene polymer. However, it is more preferred to operate at a somewhat lower processing temperatures, to minimize the thermal degradation of the brominated butadiene polymer during the process, due to the residence times (typically 1 to 10 hours) that are often seen in the process. An especially preferred temperature is from 40 to 70° C.

If the seed particles are of a material that melts, sublimes, degrades, reacts or softens at a lower temperature than does the brominated butadiene polymer, the operating temperature must in addition be low enough that the seed particles remain thermally and chemically stable during the process. By "thermally stable", it is meant that the material in question does not thermally degrade or react, melt, sublime or otherwise form a fluid under the operating conditions.

The rate at which the solvent volatilizes will of course depend on the operating pressure as well as the operating temperature. Generally, lower operating pressures will favor a more rapid volatilization of the solvent at a given temperature. In some cases, the operating pressure can be reduced below atmospheric in order to increase the rate at which the solvent is removed. This can be done, for example, if the bed becomes wet or if operating rates are slower than desired. For example, it is preferred to operate the process at a pressure that is below the vapor pressure of the solvent at the particular operating temperature, in order to keep the bed dry. Alternatively, the operating pressure can be increased in some cases in order to reduce the rate at which the solvent is removed from the droplets. This can be done, for example, if too much solvent is being removed from the droplets before they contact the bed of seed particles so that fines are being produced.

In some cases, operating at a reduced pressure can permit certain solvents to be used that could not be otherwise. For example, if a solvent has a boiling temperature at atmospheric pressure that is higher than the glass transition temperature of the neat brominated butadiene polymer, a reduced operating pressure can in some cases permit that solvent to be used. The operating pressure has little if any effect on the glass transition temperature of the brominated butadiene polymer. Therefore, reducing the operating pressure in that case may permit a higher-boiling solvent that otherwise could not be used to be volatilized rapidly at a temperature below the glass transition temperature of the neat butadiene polymer.

Therefore, operating temperature and operating pressure are selected together to obtain the necessary rate of volatilization of the solvent, while still operating at a temperature below the glass transition temperature of the neat brominated butadiene polymer. A preferred operating pressure is below the vapor pressure of the solvent at the operating temperature (i.e., the temperature of the bed of seed particles). The operating pressure may be, for example, from 1 to 50 kPa absolute, or from 10 to 40 kPa absolute.

A very small droplet size can affect the process adversely. Small droplets lose solvent more rapidly than do larger droplets as they pass through the head space of the vessel. The droplets may become so concentrated that they solidify and thus do not coat the particles in the bed. Therefore, under any specific set of operating conditions, smaller droplets are more likely to produce fines than are larger droplets. Somewhat large droplets can be tolerated as long as the bed is mechanically agitated sufficiently so that the solvent is removed before fines can form or the particles agglomerate.

Similarly, the rate at which the droplets are introduced can be adjusted, alone or in combination with other operating parameters, to control agglomeration and wetting of the particle bed. The rate at which the droplets are added can also affect fines formation. If the droplet addition rate is too great, some significant proportion of the brominated butadiene droplets will not have enough time to solidify on the surface of the seed particles before succeeding droplets come into contact with them. This can cause the soft layer to slough off the large particles and form fines. Under any set of operating conditions, there is a maximum growth rate at which the process can be operated without forming fines in this manner. This limit in general must be determined for each system, but the limit on the rate of the increase in particle diameter often tends to be on the order of about 50 to 100 microns per hour of operating time. In some cases, it may be possible to obtain higher growth rates than these. It is not necessary to operate at this limit, and lower growth rates can be obtained during the actual operation of any system.

The choice of solvent of course affects the volatility of the solvent from the brominated butadiene solution.

Agglomeration and wetting of the particle bed can be affected by the rate of mechanical agitation. A more highly agitated bed tends to stay drier under a given set of operating conditions because the individual particles are more likely to be separated from each other. Separating the particles makes the surfaces of individual particles are more likely to come into contact with the heated surfaces in the vessel and with the atmosphere in the head space of the vessel, where they can absorb energy to volatize the solvent efficiently. Increasing the agitation also imparts more thermal energy to the particles through mechanical action, which tends to increase the temperature of the particles, again favoring rapid volatilization of the solvent. Because agitation tends to heat the particle bed, it is possible to overheat the bed by agitating it too vigorously. Therefore, the amount of mechanical energy supplied through mechanical agitation is may be limited in some cases, so that one does not exceed the maximum operating temperature that is desired or necessary. If too much heating is caused by the mechanical agitation, the exterior surfaces in the vessel can be cooled to control the process temperature. Cost considerations will generally favor a lower mechanical energy input through the mechanical agitators, provided of course that the bed remains dry, and the remainder of the thermal energy as may be needed to maintain the desired operating temperature being supplied through the exterior surfaces in the vessel.

The brominated polymer feed is continued until either the desired particle size has been achieved, or the vessel cannot accommodate additional particle growth. The latter situation typically occurs when the particles fill about 70-75% of the available volume in the vessel, as a certain amount of head space is needed to allow for vapor disengagement. If the vessel cannot accommodate further particle growth, the brominated butadiene feed must be discontinued and/or some of the particles must be removed, even if the particles have not achieved the desired particle size.

Thus, in one operating mode, the particles are grown until the reaction vessel cannot accommodate additional particle growth. At that point, some of the particles are removed, and the process is resumed with the remaining particles, again growing them until the desired particle size is achieved or the vessel once again cannot accommodate more particle growth. More particles can be removed at that point, and the process can be repeated indefinitely until the desired particle size is achieved. Particles removed from the process in the various stages can be grown to larger sizes separately, or redissolved in the solvent and reintroduced into the process in the form of droplets. Note that in each iteration of the process, the surface area/unit volume of particles decreases, because the particles are successively larger in each iteration. This lower surface area will result in a larger radial growth rate in each successive iteration, and may require that the brominated butadiene polymer solution be fed more slowly in later iterations in order to avoid operating above the radial growth limit, which would result in the production of fines.

In another operating mode, particles are grown step-wise in multiple reaction vessels until the desired particle size is obtained. This operating mode is particularly suited for batch processes in which the final particles have significantly greater diameters than the seed particles (such as 2 or more times larger). In this operating mode, the particles are grown in a first reactor until the reactor cannot accommodate any further particle growth (or to some other intermediate size). The particles are then transferred to one or more other reaction vessels (which will be larger if all of the particles are transferred to it) where they can be grown further.

The process can be operated continuously. In continuous operation, a portion of the particles in the bed is removed continuously or intermittently as the process is operating, and new seed particles are continuously or intermittently provided to the bed as the process is operating. In a continuous operating mode, the number of seed particles added should at all times closely match the number of particles removed as product, in order to maintain a stable population balance as described below. The withdrawn particles will represent a cross-section of the various particles sizes in the reactor. The withdrawn particles can be classified by size by screening or other suitable method, with particles of the desired size being separated out and the smaller particles returned to the process as seed particles. Alternatively, the smaller particles can be sent to another reaction vessel of the type described herein, where they are grown further. The smaller particles also can be redissolved in solvent and reused in the process.

In some embodiments of the invention, the process is operated with a stable population balance, such that the population of particles in the reaction vessel remains essentially constant as the process is operated. In such cases, the number of particles in the reaction vessel remains approximately equal to the number of seed particles that are charged at the beginning of the process (such as ±5% or ±2%, compared to the number of starting seed particles), as brominated butadiene polymer solution is added and the particles are grown. A stable population balance is obtained in most batch processes.

In continuous processes, a stable population balance is maintained when the number of seed particles being charged to the process is always approximately equal to the number of particles that are withdrawn. When a stable population balance is maintained, essentially all of the brominated butadiene polymer that is introduced during the process goes to coat the seed particles and make them grow, rather than forming new particles. Maintaining a stable population balance favors a narrower particle size distribution in the product particles. If the number of particles in the reaction vessel varies significantly during the course of operating the process, this can lead to a broadening of the particle size distribution of the particles that are continuously or intermittently withdrawn.

Once the particles have reached the desired size, the feed of the brominated butadiene solution is stopped. The particles may continue to be mechanically agitated for a period of time afterward to drive residual solvent from the particles and prevent agglomeration. Temperature and/or pressure conditions may be maintained for a period for the same reason. Because fines production is no longer a concern, it is possible at this stage to increase temperature and/or reduce the pressure, relative to the operating conditions during addition of the brominated butadiene polymer solution, provided that the higher temperature is not sufficient to cause the particles to agglomerate or to thermally degrade. During this stage, it is often desirable to reduce the solvent content in the particles to below 1000 ppm, preferably below 100 ppm. This devolatilization can be performed in a mechanically agitated reactor of the type used to grow the particles, or another type of reactor. The devolatilization can be performed in the reaction vessel at the end of the particle growth process. It is sometimes preferred to devolatilize the particles in different equipment from that used in the particle growth process, so that higher temperatures can be used, to reduce cycle times (and thus increase production rates) or for other reasons.

The product particles can be classified by size by screening or other suitable method, if desired. Smaller particles can be recycled into the process to be grown further, used as seed particles, or redissolved in the solvent and recycled into the process. A portion of the product can be ground to form additional seed particles if desired. Fines can be used as seed particles if they are large enough, or can be redissolved in solvent and reintroduced into the process as feed solution to make droplets.

Product particles preferably have a volume average particle size of from 0.5 to 15 millimeters, especially from 1 to 10 millimeters.

When the process is operated correctly, there is little or no particle agglomeration. When agglomeration is avoided or minimal in the process, the particle size of the product can be predicted from the size of the seed particles and the amount of brominated butadiene polymer solution that is introduced during the process. Particle agglomeration results in the formation of masses that are significantly larger, i.e., at least twice as massive as the predicted particle size. The formation of agglomerates, therefore, will increase the average particle size of the product. The presence of agglomerates will also broaden the particle size distribution or create a "tail" of larger particles. Agglomerates also are evident in most cases upon visual or microscopic inspection, in which the agglomerates appear as a mass of two or more fused primary particles. For purposes of this invention, agglomerates should constitute no more 5 weight percent, preferably no more than 2 weight percent, and even more preferably no more than 1 weight percent, of the particles produced in the process (i.e., as withdrawn, prior to any classification by size).

The brominated butadiene polymer solution can contain one or more additives that are to be incorporated into the product particles. The additives should be soluble in the solvent and stable at the process temperatures. The additives should not cause the brominated butadiene polymer coating that is applied to the particles to become tacky under the operating conditions of the process. The additives may be miscible or soluble in the butadiene polymer, but that is not always necessary. Examples of additives of these types include, for example, flame retardant additives, flame retardant adjuvants, thermal stabilizers, ultraviolet light stabilizers, nucleating agents, antioxidants, foaming agents, acid scavengers and coloring agents, and the like.

In addition, one or more other polymers can be present in the brominated butadiene polymer solution. In such a case, the particles produced in the process will be a blend of the brominated butadiene polymer and any other polymer that is present in the solution.

The brominated butadiene polymer is prepared from a starting butadiene polymer in an upstream process. The starting butadiene polymer may be a homopolymer, but in most cases will be a copolymer of butadiene and one or more other monomers. Brominated butadiene homopolymers may have glass transition temperatures that are too low to allow them to be used in the process. A very low glass transition temperature can result in a tacky polymer coating being formed, which leads to particle agglomeration.

A butadiene copolymer may be a random, block or graft copolymer, and should contain at least 10% by weight of polymerized polybutadiene. Butadiene polymerizes to form two types of repeating units. One type, referred to herein as "1,2-butadiene units" takes the form

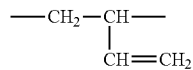

and so introduce pendant unsaturated groups to the polymer. The second type, referred to herein as "1,4-butadiene" units, takes the form —CH$_2$—CH=CH—CH$_2$—, introducing unsaturation into the main polymer chain. The butadiene polymer should contain at least some 1,2-butadiene units. Of the butadiene units in the butadiene polymer, suitably at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the butadiene polymer. The proportion of 1,2-butadiene units may be in excess of 85% or even in excess of 90% of the butadiene units in the polymer.

Methods for preparing butadiene polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci*. A-2, 9, 43-57 (1971), J. Zymona, E. Santte and H. Harwood in *Macromolecules*, 6, 129-133 (1973), and H. Ashitaka, et al., in *J. Polym. Sci., Polym. Chem.*, 21, 1853-1860 (1983).

A preferred starting material is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as alpha-methylstyrene, for example), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" are repeating units in the starting material that are formed when a vinyl aromatic monomer is polymerized. A suitable butadiene/vinyl aromatic starting copolymer contains from 5 to 90 percent by weight of polymerized vinyl aromatic monomer units and at least 10% by weight of polymerized butadiene.

A butadiene/vinyl aromatic copolymer may be a random, block (including multiblock such as diblock or triblock types) or graft type of copolymer. Styrene/butadiene block copolymers are widely available in commercial quantities. Those available from Dexco Polymers under the trade designation VECTOR™ are suitable. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

The butadiene polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the butadiene, may be polymerized to form blocks, or may be grafted onto the butadiene polymer.

The most preferred type of butadiene polymer is a block copolymer containing one or more polystyrene blocks and one or more polybutadiene blocks. Among these, block copolymers having a central polybutadiene block and terminal polystyrene blocks are especially preferred.

The butadiene polymer has, prior to bromination, a weight average molecular weight ($M_w$) within a range of from 1,000 to 400,000, preferably from 2,000 to 300,000, more preferably from 5,000 to 200,000 and even more preferably from 50,000 to 175,000. For purposes of this invention, molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 mL/min and heated to a temperature of 35° C. as the eluent.

The starting butadiene polymer preferably is brominated by contacting it with a brominating agent such as elemental bromine (as described, for example, in WO 2008/021418), a quaternary ammonium tribromide (as described, for example, in WO 2008/021417), or a quaternary phosphonium tribromide, in the presence of a solvent. A crude brominated butadiene solution obtained from such a bromination process may be subjected to an aqueous extraction step, in which a crude brominated butadiene polymer obtained from a bromination step is extracted with water, typically containing a reducing agent, to produce a washed solution of the brominated butadiene solution. Either the crude or the washed brominated butadiene solution can be used as a starting material in the method of the invention.

The brominated butadiene polymer particles produced in the invention are useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated copolymer is soluble or can be dispersed to form domains of less than 10 μm, preferably less than 5 μm, in size. Enough of the brominated butadiene polymer is preferably present in the blend to provide the blend with a bromine content within a range of from 0.1 percent by weight to 25 percent by weight, based upon blend weight.

Blends of the brominated butadiene polymer may include other additives such as other flame retardant additives, flame retardant adjuvants, thermal stabilizers, ultraviolet light stabilizers, nucleating agents, antioxidants, foaming agents, acid scavengers and coloring agents. As mentioned before, these can be in some cases added to the solution or slurry of the brominated butadiene polymer that is used as a starting material in this process.

The following examples are provided to illustrate the invention, but not to limit the scope thereof. All parts and percentages are by weight unless otherwise indicated.

EXAMPLE 3.2 kg of sand (silica) particles having a volume median particle size of approximately 270 μm (as measured with a Beckman Coulter LS13 320 dry powder particle size analyzer) are charged to a Littleford Day lab scale (5 L) horizontal plowshare reactor. The reactor is equipped with a water jacket for heating and cooling, a vacuum pump, a baghouse for filtering fines from exhaust gasses, inlets for introducing a purge gas, and a single fluid nozzle for introducing a liquid spray into the vessel.

The sand particles are heated to 68° C. with enough mechanical agitation to fluidize the bed without entraining seed particles in the exhaust stream. The pressure inside the reactor is adjusted to 27 kPa absolute, and a solution of 10 wt % of a brominated butadiene/styrene block copolymer in dichloroethane (solvent) is sprayed in at a rate of approximately 0.14 kg/min. An exhaust stream is continually withdrawn from the reactor to maintain the internal pressure at 25 kPa absolute. The solvent vapor pressure is 150 kPa at this temperature. The reactor pressure being lower than the solvent vapor pressure indicates that the bed of particles is dry. The temperature of the bed of particles drops to 51° C. when the brominated butadiene solution feed is begun. As the jacket is at 95° C., the large temperature difference between the jacket and the fluidized bed of solids indicates good heat transfer.

The process is operated under these conditions for approximately 30 minutes. During this time, the brominated butadiene polymer droplets coat the particles, increasing their size. At the conclusion of the polymer solution feed, the feed nozzle is rinsed briefly with solvent to prevent plugging. The bed is then devolatilized by continuing the agitation for another 30 minutes without applying heat through the steam jacket. The mechanical energy of the agitator supplies sufficient energy that even with the jacket flow off, the bed temperature rises to about 70° C. during the devolatilization step. The system pressure drops to about 13 kPa as there is little vapor flow in the overheads system once the nozzle rinse is completed. After the devolatilization step is completed, the bed is cooled to about 41° C., at which point product solids flow freely from the outlet port when it is opened. The volume median particle size of the product is about 340 μm, an increase of 26%. This corresponds to approximately a doubling of the volume of the starting particles. Some fines are produced under these conditions as well as a few larger agglomerates, but the inside surfaces of the reactor are clean, indicating that none of the brominated butadiene polymer coated onto the reactor surfaces. The particles have a slightly gray coloration, which is believed to be due to the abrasive nature of the starting silica particles. The silica particles are believed to cause some abrasion of the stainless steel surfaces of the reactor before they become coated with the polymer.

In a similar run using fresh sand as the seed particles, the feed is sprayed onto the bed for 70 minutes at a rate of 0.10 kg/min. The volume median particle size for the final particle product is about 710 μm, a particle growth of 170% by diameter, and about 2000% by volume.

What is claimed is:

1. A process for producing particles of a brominated butadiene polymer, comprising dispersing a solution of the brominated butadiene polymer to form droplets, and applying the droplets onto a mechanically agitated bed of seed particles heated to a temperature of 40 to 70° C. in a reaction vessel at a subatmospheric pressure, such that the droplets coat the surfaces of seed particles substantially without agglomerating individual particles and solvent volatilizes from the coated seed particles before the coated seed particles become contacted by successive droplets of the brominated butadiene solution that are subsequently introduced into the reaction vessel, to form substantially nonagglomerated product particles having a solid external layer of the brominated butadiene polymer, wherein the process is performed continuously and a stable population balance of particles is maintained in the reaction vessel.

2. The process of claim 1 wherein the volume of the product particles is about 2.9 to 1000 times that of the seed particles.

3. The process of claim 2 wherein the seed particles have a volume median particle diameter of from 50 microns to 3000 microns.

4. The process of claim 3 wherein the substantially nonagglomerated product particles have a volume median particle diameter of from 0.5 to 15 millimeters.

5. The process of claim 4 which is conducted in a horizontal plowshare reactor.

6. The process of claim 4 wherein the temperature of the bed of seed particles is below the highest glass transition temperature of the brominated butadiene polymer.

7. The process of claim 1 wherein the temperature of the bed of seed particles is below the highest glass transition temperature of the brominated butadiene polymer.

* * * * *